United States Patent
Hechenbleikner et al.

[15] 3,699,152
[45] Oct. 17, 1972

[54] SULFUR CONTAINING ESTERS OF SUBSTITUTED HYDROXYPHENYL-ALKANOIC ACIDS

[72] Inventors: Ingenuin A. Hechenbleikner, Kenwood; John F. Hussar, Loveland; Arthur F. Koeniger, Cincinnati; Robert E. Bresser, Sharonville, all of Ohio

[73] Assignee: Carlisle Chemical Works, Inc., Reading, Ohio

[22] Filed: Dec. 10, 1969

[21] Appl. No.: 884,016

[52] U.S. Cl. ............260/473 S, 260/45.85, 260/470, 260/481 R, 260/521 R, 260/570.9, 260/592, 260/810, 99/163, 99/164, 252/404
[51] Int. Cl. ............................................C07c 65/04
[58] Field of Search ................260/470, 473 R, 473 S

[56] References Cited

UNITED STATES PATENTS 3,457,286  7/1969  Dexter et al........260/473 R X

OTHER PUBLICATIONS

Dexter et al., Chem. Abst. 60, 2854g (1964).

Primary Examiner—Lorraine A. Weinberger
Assistant Examiner—John F. Terapane
Attorney—Cushman, Darby & Cushman

[57] ABSTRACT

Compounds are prepared having one of the following formulas:

a. $HOR_1CH_2S(CH_2)_nCOOR_4$ b. $HOR_1(\overset{R_{14}}{\underset{|}{CH}})yCH_2COOR_2$ c. $HOR_1C_mH_{2m-1}(S(CH_2)_nCOOR_3)_2$
d. $(HOR_1CH_2)_2C(COOR_2)_2$
e. $HOR_1CH_2O(CH_2)_nCOOR_2$
f. $HOR_1CH_2OCH_2CH_2OOCCH_2CH_2S(CH_2)_nCOOR_3$
g. $HOR_1CH_2CH(COOR_2)_2$ h. $HOR_1CH=C\diagdown^{COOR_2}_{COOR_2}$ where $HOR_1$ is

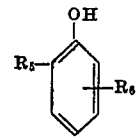

where $R_5$ and $R_6$ are hydrogen, alkyl, cycloalkyl, aryl or aralkyl, the total carbon atoms in $R_5$ and $R_6$ is between four and 36 carbon atoms, is preferably not over 12 carbon atoms and $R_6$ is preferably in the ortho position, $R_2$ is $$-CH_2(C_nH_{2n})S(\overset{R_{15}}{\underset{|}{C_nH_{2n}}}-1)COOR_3$$
$$CO_2S(CH_2)_nCOOR_3$$
$$CH_2\overset{|}{C}HS(CH_2)_nCOOR_3$$

or $$CH_2-\underset{\underset{C_nH_{2n+1}}{|}}{C}(CH_2OCH_2CH_2CH_2S(CH_2)_nCOOR_3)_2$$

$R_3$ is hydrocarbyl, preferably alkyl or alkenyl, e.g., of one to 18 carbon atoms, $n$ is 1 or 2, $R_{14}$ is H or $COOR_2$, $m$ is 1, 2, 3 or 4, $y$ is 0 or 1, and $R_4$ is either $R_2$ or $R_3$ and $R_{15}$ is hydrogen or lower alkyl. The above compounds are useful as antioxidants.

14 Claims, No Drawings

SULFUR CONTAINING ESTERS OF SUBSTITUTED HYDROXYPHENYL-ALKANOIC ACIDS

The present invention relates to the preparation of novel phenolic antioxidants.

The compounds of the invention have one of the following formulae.

a. $HOR_1CH_2S(CH_2)_nCOOR_4$ (b)

c. $HOR_1C_mH_{2m+1}(S(CH_2)_nCOOR_3)_2$
d. $(HROR_1CH_2)_2C(COOR_2)_2$
e. $HOR_1CH_2O(CH_2)_nCOOR_2$
f. $HOR_1CH_2OCH_2CH_2OOCCH_2CH_2S(CH_2)_nCOOR_3$
g. $HOR_1CH_2CH(COOR_2)_2$ (h)
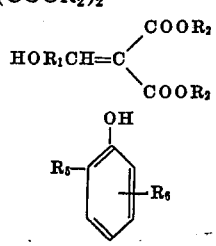

where $HOR_1$ is

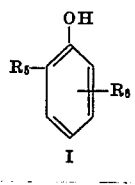

where $R_5$ and $R_6$ are hydrogen, alkyl, cycloalkyl, aryl or aralkyl, the total carbon atoms in $R_5$ and $R_6$ is between four and 36, is preferably not over 12 carbon atoms and $R_6$ is preferably in the ortho position, $R_2$ is

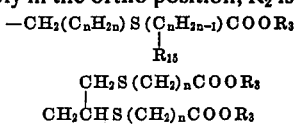

or

$R_3$ is hydrocarbyl preferably alkyl or alkenyl, e.g., of one to 18 carbon atoms, $R_{14}$ is hydrogen or $COOR_2$, $R_{15}$ is hydrogen or lower alkyl, $n$ is 1 or 2, $m$ is 1, 2, 3 or 4, $y$ is 0 or 1, and $R_4$ is either $R_2$ or $R_3$.

The general procedure for making the compounds of the present invention is somewhat similar to that in Geigy Belgian Pat. No. 710,873 and Goodrich French Pat. No. 1,536,020 (Dutch application 6,712,339).

As starting reactants there can be used hindered phenols such as 2,6-di-t-butyphenol and other phenols having the formula

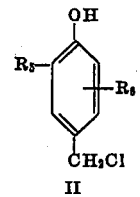

including but not limited to those set forth in Table 1.

TABLE 1

| Compound | $R_5$ | $R_6$ |
|---|---|---|
| 1 | t-butyl | 6-t-butyl |
| 2 | t-butyl | H |
| 3 | t-butyl | 5-t-butyl |
| 4 | octadecyl | 6-octadecyl |
| 5 | methyl | 6-propyl |
| 6 | t-amyl | 6-ethyl |
| 7 | isooctyl | 5-methyl |
| 8 | isooctyl | H |
| 9 | isopropyl | 6-isopropyl |
| 10 | sec. butyl | 5-sec. butyl |
| 11 | sec. butyl | 3-sec. butyl |
| 12 | sec. butyl | 6-sec. butyl |
| 13 | butyl | 6-butyl |
| 14 | octyl | 5-octyl |
| 15 | t-butyl | 6-methyl |
| 16 | t-butyl | 5-octadecyl |
| 17 | cyclohexyl | 6-ethyl |
| 18 | benzyl | 6-benzyl |
| 19 | octadecyl | H |
| 20 | octadecyl | 6-methyl |
| 21 | cyclododecyl | 6-methyl |
| 22 | nonyl | 6-nonyl |

Other hindered phenol starting materials are 3,5-di-t-butyl-4-hydroxybenzyl chloride and other phenols having the formula

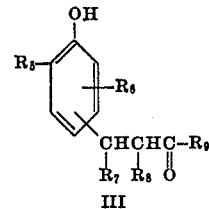

including but not limited to those set forth in Table 2.

TABLE 2

| Compound | $R_5$ | $R_6$ |
|---|---|---|
| 1a | t-butyl | 6-t-butyl |
| 2a | t-butyl | H |
| 3a | t-butyl | 5-t-buty. |
| 4a | octadecyl | 6-octadecyl |
| 5a | methyl | 6-propyl |
| 6a | t-amyl | 6-ethyl |
| 7a | isooctyl | 5-methyl |
| 8a | isooctyl | H |
| 9a | isopropyl | 6-isopropyl |
| 10a | sec. butyl | 5-sec. butyl |
| 11a | sec. butyl | 3-sec. butyl |
| 12a | sec. butyl | 6-sec. butyl |
| 13a | butyl | 6-butyl |
| 14a | octyl | 5-octyl |
| 15a | t-butyl | 6-methyl |
| 16a | t-butyl | 5-octadecyl |
| 17a | cyclohexyl | 6-ethyl |
| 18a | benzyl | 6-benzyl |
| 19a | octadecyl | H |
| 20a | octadecyl | 6-methyl |
| 21a | cyclododecyl | methyl |
| 22a | nonyl | 6-nonyl |

Additional starting materials are made by reacting a hindered phenol such as in Table 1 with an ethylenically unsaturated compound in the presence of a condensing agent, e.g., anhydrous $AlCl_3$ or $BF_3$. As ethylenically unsaturated compounds there can be used acrylic acid, methacrylic acid, methyl vinyl ketone, butyl vinyl ketone, methyl methacrylate, ethyl acrylate, methyl acrylate, methyl allyl ketone, maleic acid, itaconic acid, vinyl esters, e.g., vinyl acetate, vinyl butyrate, vinyl propionate, vinyl ethers, e.g., methyl vinyl ether, butyl vinyl ether, maleic acid and the like. Such intermediates have the formula $R_7$ is H, COOH or lower alkyl, $R_8$ is H, lower alkyl or $CH_2COOH$, $R_9$ is OH or lower alkyl.

For example 2,6-di-t-butyl phenol and acrylic acid in the presence of $AlCl_3$ gave 3-(3,5-di-t-butyl-4-hydroxyphenyl) propionic acid. In place of 2,6-di-t-butylphenol there can be used any of the phenols in Table 1 to give the corresponding 3-substituted propionic acids. Similarly replacing the acrylic acid by methacrylic acid gave 3-(3,5-di-t-butyl-4-hydroxyphenyl)-2-methyl propionic acid or by ethacrylic acid gave 3-(3,5-di-t-butyl-4-hydroxyphenyl)- 2-ethyl propionic acid, or by crotonic acid gave 3-(3,5-di-t-butyl-4-hydroxyphenyl)-3-methyl propionic acid.

The starting compounds can also be prepared by the method of U.S. Pat. No. 3,247,240 in which the hindered phenol is reacted with an appropriate vinyl compound in the presence of a basic catalyst such as sodium t-butoxide or sodium methylate. For example there were added to 169.5 parts of 2,6-di-t-butyl phenol, 4.9 parts of sodium methylate under a nitrogen atmosphere. Then 78.8 parts of methyl acrylate were added over a period of 20 minutes. When the exothermic reaction had subsided the mixture was heated at 60° C. for 3 hours and methyl-3-(3,5-di-t-butyl-4-hydroxyphenyl) propionate isolated, M.P. 63°–64.5° C. after recrystallization. Methyl vinyl ketone with 2,6-di-t-butyl phenol using $AlCl_3$ as a condensing agent gave 1-(3,5-di-t-butyl-4-hydroxyphenyl)-3-butanone. In place of 2,6-di-t-butyl phenol there can be used any of the phenols in Table 1 to give the corresponding 1-substituted 3-butanones. Similarly replacing the methyl vinyl ketone by ethyl vinyl ketone gave 1-(3,5-di-t-butyl-4-hydroxyphenyl)-3 -pentanone, or by methyl vinyl ketone gave 1-(3,5-di-t-butyl-4-hydroxyphenyl)-2-methyl-3-butanone. Maleic acid with 2,6-di-t-butyl phenol using $AlCl_3$ as a condensing agent gave α-(3,5-di-t-butyl-4-hydroxyphenyl) succinic acid. In place of 2,6-di-t-butyl phenol there can be used any of the phenols in Table 1 to give the corresponding α-substituted succinic acids. Similarly replacing the maleic acid by itaconic acid gave α-(3,5-di-t-butyl-4-hydroxybenzyl) succinic acid.

Any of the free acids can be reacted to form the corresponding allyl esters in the presence of a mineral acid, e.g., hydrochloric acid or sulfuric acid or a strong organic acid such as p-toluene sulfonic acid with or without an appropriate inert hydrocarbon such as benzene, toluene or heptane to remove the water of reaction. Thus, there can be prepared allyl 3-(3,5-di-t-butyl-4-hydroxyphenyl) propionate as well as the corresponding allyl 3-substituted propionates of any of the other phenols in Table 1; the diallyl 1-(3,5-di-t-butyl-4-hydroxyphenyl) succinate as well as the corresponding diallyl 1-substituted succinates of any of the other phenols in example 1.

As intermediates for reacting with 3,5-di-t-butyl-4-hydroxybenzyl chloride (or the corresponding benzyl, N,N-dialkyl amine) or the other benzyl chlorides of Table 2 there can be used the addition products of diallyl malonate with hydrocarbyl, preferably alkyl or alkenyl mercaptopropionates or mercaptoacetates such as methyl mercaptopropionate, butyl mercaptopropionate, octyl mercaptopropionate, isooctyl mercaptopropionate, stearyl mercaptopropionate, oleyl mercaptopropionate, cyclohexyl mercaptopropionate, lauryl mercaptopropionate, methyl mercaptoacetate, ethyl mercaptoacetate, butyl mercaptoacetate, amyl mercaptoacetate, hexyl mercaptoacetate, decyl mercaptoacetate, cetyl mercaptoacetate, lauryl mercaptoacetate, linoleyl mercaptopropionate, linolenyl mercaptopropionate, phenyl mercaptopropionate, p-tolyl mercaptoacetate, phenyl mercaptoacetate, o-tolyl mercaptopropionate, benzyl mercaptoacetate, benzyl mercaptopropionate.

For making compounds where $R_2$ is

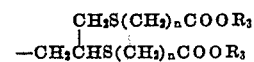

there can be used as intermediates dihydrocarbyl, preferably dialkyl or dialkenyl, dithiodipropionates and dithiodiacetates such as dilauryl dithiodipropionate, dilauryl dithiodiacetate, dimethyl dithiodipropionate, diethyl dithiodiacetate, dioctadecyl dithiodipropionate, dioctadecyl dithiodiacetate, dioleyl dithiodipropionate, dioleyl dithiodiacetate, diphenyl dithiodipropionate, dibenzyl dithiodiacetate.

The compounds of the invention within Formula (a) are prepared by reacting a compound having the formula $HOR_1CH_2SH$ with a compound having the formula $CH_2=CHCOOR_4$ or by reacting a compound having the formula $HOR_1CH_2SCH_2CH_2COOCH_2CH=CH_2$ with a compound having the formula $R_3OOC(CH_2)_nSH$.

The compounds of the invention within Formula (b) can be prepared reacting a compound having the formula

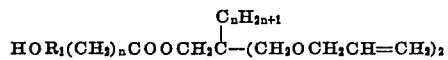

with a compound having the formula $R_3OOC(CH_2)_nSH$ or by reacting a compound having the formula when $R_7$ and $R_8$ are both hydrogen with a compound having the formula $R_3OOC(CH_2)_nSH$.

The compounds of the invention within Formula (c) can be prepared by reacting a compound having the formula

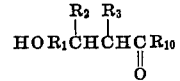

where $R_{10}$ is lower alkyl with a compound having the formula $R_3OOC(CH_2)_nSH$ or by reacting a compound having the formula $HOR_1CHO$ with a compound having the formula $R_3OOC(CH_2)_nSH$.

The compounds of the invention within Formula (d) are prepared by reacting a compound having the formula

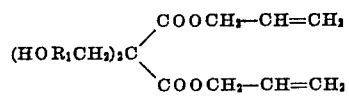

with a compound having the formula $R_3OOC(CH_2)_nSH$. The compound having the formula

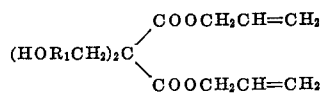

can be prepared by the procedure of Belgian Pat. No. 710,873, e.g., Example 1 or French Pat. No. 1,536,020 Example 1 replacing the diethyl malonate by diallyl malonate. Alternatively the lower alkyl products of the Belgian or French patent, e.g., diethyl 2,2-bis(3',5'-di-t-butyl-4'-hydroxybenzyl)-malonate can be transesterified with allyl alcohol to form the diallyl ester.

The compounds of the invention within Formula (e) are prepared by reacting a compound having the formula $HOR_1CH_2Cl$ with allyl glycolate or allyl hydroxypropionate and then with a hydrocarbyl mercaptoacetate or mercaptopropionate.

The compounds of the invention within Formula (f) can be prepared by reacting a compound having the formula $HOR_1CH_2Cl$ with hydroxyethyl acrylate and then with a hydrocarbyl mercaptoacetate or mercaptopropionate.

The compounds of the invention within Formula (g) can be prepared by reacting a compound having the formula $HOR_1CH_2Cl$ or

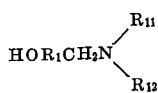

where $R_{11}$ and $R_{12}$ are alkyl with a compound having the formula

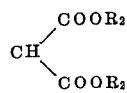

The compounds of the invention within Formula (h) are prepared by reacting a compound having the formula $HOR_1CHO$ with a compound having the formula

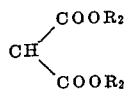

Representative of compounds within Formula (a) are 3,5-di-t-butyl-4-hydroxybenzylallylcarboxyethyl sulfide (also called allyl-3-(3,5-di-t-butyl-4-hydroxybenzylthio propionate) and prepared by reacting 3,5-di-t-butyl-4-hydroxybenzyl mercaptan with allyl acrylate (or with acrylic acid followed by esterification with allyl alcohol) or the corresponding analogues prepared by replacing the 3,5-di-t-butyl-4-hydroxybenzyl mercaptan with a mercaptan of the formula

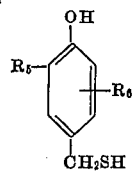

Illustrative of such mercaptans are those set forth in Table 3.

TABLE 3

| Compound | $R_5$ | $R_6$ |
|---|---|---|
| 1 | t-butyl | 6-t-butyl |
| 2 | t-butyl | H |
| 3 | t-butyl | 5-t-butyl |
| 4 | octadecyl | 6-octadecyl |
| 5 | methyl | 6-propyl |
| 6 | t-amyl | 6-ethyl |
| 7 | isoctyl | 5-methyl |
| 8 | isooctyl | H |
| 9 | isopropyl | 6-isopropyl |
| 10 | sec. butyl | 5-sec. butyl |
| 11 | sec. butyl | 3-sec. butyl |
| 12 | sec. butyl | 6-sec. butyl |
| 13 | butyl | 6-butyl |
| 14 | octyl | 5-octyl |
| 15 | t-butyl | 6-methyl |
| 16 | t-butyl | 5-octadecyl |
| 17 | cyclohexyl | 6-ethyl |
| 18 | benzyl | 6-benzyl |
| 19 | octadecyl | H |
| 20 | octadecyl | 6-methyl |
| 21 | cyclododecyl | 6-methyl |
| 22 | nonyl | 6-nonyl |

Also within Formula (a) are 3,5-di-t-butyl-4-hydroxybenzyl lauryl carboxyethyl sulfide (prepared by reacting 3,5-di-t-butyl-4 hydroxybenzyl mercaptan with lauryl acrylate) or the corresponding analogues prepared by replacing the 3,5-di-t-butyl-4 hydroxybenzyl mercaptan with each of the mercaptans in Table 3. Also within Formula (a) are the compounds made replacing lauryl acrylate with other hydrocarbyl acrylates, e.g. methyl acrylate, octadecyl acrylate, oleyl acrylate, benzyl acrylate, phenyl acrylate, p-tolyl acrylate, cyclohexyl acrylate, isooctyl acrylate, 2-ethyl hexyl acrylate with 3,5-di-t-butyl-4-hydroxybenzyl mercaptan.

Furthermore within Formula (a) is 3-(butoxycarboethylthio propyl-3'-(3,5-di-t-butyl-4-hydroxybenzylthio) propionate made from allyl-3-(3,5-di-t-butyl-4-hydroxybenzyl-thio) propionate and butyl mercaptopropionate as well as the corresponding analogues made by replacing butyl mercaptopropionate by any of the hydrocarbyl mercaptoacetates or mercaptopropionates set forth previously (i.e., those mentioned as suitable for reacting with diallyl malonate). Additionally within Formula (a) are the compounds prepared by reacting butyl mercaptopropionate with any of the analogues of allyl-3-(3,5-di-t-butyl-4-hydroxybenzylthio) propionate set forth supra.

Within Formula (b) are 2,3-bis(dodecoxycarboethylthio) propyl-3-(3,5-di-t-butyl-4-hydroxyphenyl) propionate and the corresponding compounds made by replacing the dilauryl dithiodipropionate in example 6 with any of the dihydrocarbyl dithiodipropionates or dithiodiacetates set forth previously as well as the compounds prepared by reacting dilauryl dithiodipropionate with any of the analogues of allyl-3-(3,5-di-t-butyl-4-hydroxybenzylthio) propionate set forth supra.

Also within Formula (b) are 2,2-bis[3-(dodecoxycarboethylthio) propoxymethyl]butyl-3 -(3,5-di-t- butyl-4-hydroxyphenyl) propionate and its analogues prepared by replacing the lauryl mercaptopropionate in example 7 with any of the other hydrocarbyl mercapto acetates and propionates set forth supra as well as the compounds made by reacting lauryl mercaptopropionate with compounds of the type 2,2-bis(allyloxymethyl) butyl-3'-(3,5-di-t-butyl-4-hydroxyphenyl) propionate but having the 3,5-di-t-butyl-4-hydroxyphenyl group replaced by the corresponding group of any of the phenols set forth in Table 1.

Additionally within Formula (b) are bis[3-(dodecyloxycarboethylthio) propyl]-α-(3,5-di-t-butyl-4-hydroxyphenyl) succinate and its analogues prepared by replacing the lauryl mercaptopropionate in example 11 with any of the other hydrocarbyl mercapto acetates and mercaptopropionates set forth supra as well as the compounds made by reacting lauryl mercaptopropionate with compounds of the type diallyl-α-(3,5-di-t-butyl-4-hydroxyphenyl) succinate but having the 3,5-di-t-butyl-4-hydroxyphenyl group replaced by the corresponding group of any of the phenols set forth in Table 1.

Furthermore within Formula (b) are dodecyloxycarboethylthiopropyl (3,5-di-t-butyl-4-hydroxyphenyl) propionate and its analogues prepared by replacing the lauryl mercaptopropionate in example 12 with any of the other hydrocarbyl mercaptoacetates and mercaptopropionates set forth supra as well as any of the compounds made by reacting lauryl mercaptopropionate with compounds of the type allyl-β-(3,5-di-t-butyl-4-hydroxyphenyl) propionate but having the 3,5-di-t-butyl-4-hydroxyphenyl group replaced by the corresponding group of any of the phenols set forth in Table 1.

Within Formula (c) are 1-(3,5-di-t-butyl-4-hydroxyphenyl)-3,3-bis(dodecoxycarboethylthio) butane and its analogues prepared by replacing the lauryl mercaptopropionate in Example 2 with any of the other hydrocarbyl mercaptoacetates and mercaptopropionates set forth supra as well as any of the compounds made by reacting lauryl mercaptopropionate with compounds of the type 1-(3,5-di-t-butyl-4-hydroxyphenyl)-3-butanone but having the 3,5-di-t-butyl-4-hydroxyphenyl group replaced by the corresponding group of any of the phenols in the Table 1 supra or by reacting lauryl mercaptopropionate with 1-(3,5-di-t-butyl-4-hydroxyphenyl)-3-pentanone or 1-(3,5-di-t-butyl-4-hydroxyphenyl)-2-methyl-3-butanone or other compounds of Formula III.

Also within Formula (c) are bis(carbodecoxyethylthio)-4-hydroxy-3,5-di-t-butylphenyl methane and its analogues prepared by replacing the lauryl mercaptopropionate in example 13 with any of the other hydrocarbyl mercaptoacetates and mercaptopropionates set forth supra as well as any of the compounds made by reacting lauryl mercaptopropionate with compounds of the type 3,5-di-t-butyl-4-hydroxybenzaldehyde but having the 3,5-di-t-butyl-4-hydroxyphenyl group replaced by the corresponding group of any of the phenols in Table 1 supra.

Within Formula (d) are bis(3,5-di-t-butyl-4-hydroxybenzyl) bis(butoxycarboethylthiopropyl) malonate and its analogues prepared by replacing the butyl mercaptopropionate in Example 4 with any of the other hydroxycarbyl mercaptoacetates and mercaptopropionates set forth supra as well as any of the compound by reacting butyl mercaptopropionate with compounds of the type diallyl bis(3,5-di-t-butyl-4-hydroxybenzyl)malonate but having the 3,5-di-t-butyl-4-hydroxybenzyl group replaced by the corresponding group of any of the hydroxybenzyl compounds in Table 2.

Within Formula (e) are 3,5-di-t-butyl-4-hydroxybenzylbutyl carboxyethylthiopropylcarboxymethyl ether and its analogues prepared by replacing the butyl mercaptopropionate in example 16 with any of the other hydrocarbyl mercaptoacetates and mercaptopropionates set forth supra as well as any of the compounds made by replacing the 4-hydroxy-3,5-di-t-butyl hydroxy benzyl chloride in example 16 with any of the substituted benzyl chlorides in Table .

Within Formula (f) are 3,5-di-t-butyl-4-hydroxybenzyl laurylcarboxyethylthioethylcarboxethyl ether and its analogues prepared by replacing the lauryl mercaptopropionate in example 18 with any of the other hydrocarbyl mercaptoacetates and mercaptopropionates set forth supra as well as any of the compounds made by replacing the 4-hydroxy-3,5-di-t-butyl-4-hydroxybenzyl chloride in example 18 with any of the substituted benzyl chlorides in TAble 2.

Within Formula (g) are 2,6-di-t-butyl-4-[ethylene bis(butyl-3-thiopropoxycarbopropionate)] phenol and the corresponding products made by reacting N,N-dimethyl-3,5-di-t-butyl-4-hydroxybenzyl amine with the addition product of any hydrocarbyl mercaptoacetate or mercaptopropionate set forth supra with diallyl malonate. Also within Formula (g) are the reaction products of methylene bis (butyl-3-thiopropoxycarbopropionate) with any of the substituted benzyl chlorides in Table 2.

Within Formula (h) are 3,5-di-t-butyl-4-hydroxybenzyl methylene bis(methyl-2-methyl-3-thioethoxycarbopropionate) and its analogues prepared by replacing methylene bis(methyl-2-methyl-3-thioethoxycarbopropionate) by other esters in which the esterifying group instead of methyl is isooctyl, dodecyl, octadecyl, cyclohexyl, benzyl, phenyl or p-tolyl for example. The methylene bis(methyl-2-methyl-3-thioethoxycarboptopionate) can be prepared by the addition of methyl methacrylate to bis(2-mercaptoethyl) malonate.

Also within Formula (h) are the reaction products of methylene bis(methyl-2-methyl-3-thioethoxycarbopropionate) with compounds of the type 3,5-di-t-butyl-4-hydroxybenzaldehyde but having the 3,5-di-t-butyl-4-hydroxyphenyl group replaced by the corresponding group of any of the phenols in Table 1 supra. In making the compounds of group (h) in place of using hydrocarbyl methacrylates there can be used hydrocarbyl acrylates for addition to the bis(2-mercaptoethyl) malonate.

Unless otherwise indicated all parts and percentages are by weight.

The compounds of the present invention are primarily useful as antioxidants and stabilizers for hydrocarbon resins but are also useful with any resin requiring stabilization against atmospheric exposure. Thus, they can also be used with halogen containing resins.

As the halogen containing resins there can be used resins made from vinylidene compounds such as vinyl chloride, vinylidene chloride, vinyl chloroacetate, chlorostyrenes, vinyl bromide and chlorobutadienes.

Such vinylidene compounds may be polymerized alone or in admixture with each other or with other vinylidene compounds. Thus, vinyl chloride can be copolymerized with vinyl esters of carboxylic acids, e.g., vinyl acetate and vinyl butyrate esters of unsaturated acids, e.g., acrylates such as methyl acrylate, ethyl acrylate, butyl acrylate and allyl acrylate as well as the corresponding methacrylates, e.g., methyl methacrylate and butyl methacrylate, vinyl aromatic compounds, e.g., styrene, divinyl benzene, α-methyl styrene, p-methyl styrene, dienes such as butadiene and isoprene, unsaturated amides such as acrylamide, methacrylamide and the esters of α, β-unsaturated carboxylic acids. Specific examples of such esters are diethyl maleate, dibutyl maleate and dibutyl fumarate.

The stabilizers of the present invention are also effective when intimately mixed with halogen containing resins in which part or all of the halogen is introduced into a preformed resin, e.g., chlorinated polyethylene, and rubber hydrochloride.

Typical examples of copolymers include vinyl chloride-vinyl acetate(95:5 weight ratio), vinyl chloride-vinyl acetate (87:13 weight ratio), vinyl chloride-vinyl acetate maleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The resin, e.g., polyvinyl chloride, can either be plasticized or unplasticized. As the plasticizer there can be employed conventional material such as dioctyl phthalate. The plasticizer is used in conventional amount, e.g., 10 to 100 parts for each 100 parts of the vinyl chloride containing resin.

The mercapto containing stabilizers of the present invention are used in an amount of 0.05 to 20 parts, preferably 0.1 to 10 parts per 100 parts of halogen containing resin.

There can also be incorporated 0.1 to 10 parts per 100 parts of the halogen containing resin conventional metal salt stabilizers. Thus, there can be used barium, strontium, calcium, cadmium, zinc, lead, tin, magnesium, cobalt, nickel, titanium and aluminum salts of phenols, aromatic carboxylic acids, fatty acids and epoxy fatty acids.

Also there can be incorporated a phosphite, e.g., an alkyl, aryl or aralkyl phosphite in an amount of 0.1 to 10 parts per 100 parts of resin. Typical of such phosphites are triphenyl phosphite, tris decyl phosphite, decyl diphenyl phosphite, di(p-tert. butylphenyl) phenyl phosphite, diphenyl o-cresyl phosphite, trioctyl phosphite, tricresyl phosphite and tribenzyl phosphite.

The compounds of the present invention are also stabilizers for monoolefin polymers such as polyethylene, polypropylene, ethylene propylene copolymers (e.g. 50:50 80:20 and 20:80), ethylene-monoolefin copolymers wherein the monoolefin has four to 10 carbon atoms and is present in a minor amount, e.g., ethylene-butene-1 copolymer (95:5) and ethylene-decene-1 copolymer (90:10). Furthermore, they can be used to stabilize natural rubber, styrene-butadiene rubber (SBR rubber), e.g., (75 percent butadiene, 25 percent styrene) and EPDM rubbers and acrylonitrile-butadiene styrene terpolymers (ABS).

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent propylene) and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims the term nonconjugated polyolefin includes aliphatic unconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclooctadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g., ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in U.S. Pat. Nos. 2,933,480; 3,000,866; 3,063,973; 3,093,620; 3,093,621, and 3,136,739, in British Pat. No. 880,904 and in Belgian Pat. No. 623,698.

Terpolymers and other EPDM rubbers from ethylene, propylene and dicyclopentadiene are exemplified in Tarney U.S. Pat. No. 3,000,866; Adamek U.S. Pat. No. 3,136,739 and Dunlop (British) Pat. No. 880,904. EPDM rubbers from ethylene, propylene and 1,4-hexadiene are exemplified in Gresham U.S. Pat. No. 2,933,480. As in Gresham other suitable nonconjugated diolefins are 1,4-pentadiene; 2-methyl-1,5 hexadiene, 3,3-dimethyl-1, 5-hexadiene, 1,7-octadiene, 1,9-decadiene, 1,19-eicosadiene, 1,9-octadecadiene, 6-methyl-1,5-heptadiene, methyl-1,6-octadiene, 11-ethyl-1,11-tridecadiene.

EPDM rubbers from ethylene, propylene and 5-methyl-2-norbornene are exemplified in U.S. Pat. No. 3,093,621. Suitable norbornadiene, e.g., 2-methyl norbornadiene, 2-ethyl norbornadiene, 2-n-heptyl norbornadiene are shown in Glading U.S. Pat. No. 3,063,973 and bicyclo compounds such as bicyclo (2,2,2) heptadiene-2,5 are shown in Dunlop (British) Pat. No. 880,904. The use of cyclooctadiene-1,5 and other cyclodienes is shown in Montecatini (Belgium) Pat. No. 623,698. Thus these can be used in making the EPDM elastomer 1,4-cycloheptadiene, 1,4-cyclooctadiene, 1,6-cyclodecadiene, 1,5-cyclododecadiene, 1,7-cyclodecadiene, 1,5,9-cyclododecatriene, 1-methyl-1,5-cyclooctadiene.

The compounds of the present invention are normally employed in an amount of at least 0.01 percent and usually 0.1 percent to 10 percent by weight of the polymer they are intended to stabilize.

They can also be used as synergistic stabilizers with other sulfur containing compounds. Thus, there can be employed therewith neutral sulfur compounds having a thio linkage beta to a carbon atom having both a hydrogen atom and a carboxyl group attached thereto. Such compounds are used in an amount of 0.01 to 10 percent, preferably 0.1 – 5 percent. Thus there can be used pentaerythritol tetra (mercaptoacetate), 1,1,1-trimethylolethane tri (mercaptoacetate), 1,1,1-trimethylolpropane tri (mercaptoacetate), dioleyl thiodipropionate, dilauryl thiodipropionate, other thio compounds include distearyl 3,3'-thiodipropionate, dicyclohexyl-3,3'-thiodipropionate, dicetyl-3,3'-thiodipropionate, dioctyl-3,3'-thiodipropionate, dibenzyl-3,3'-thiodipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, dibenzyl-3,3'-thiodipropionate, diethyl-3,3'-thiodipropionate, lauryl ester of 3-methylmercapto propionic acid, lauryl ester of 3-butylmercapto propionic acid, lauryl ester of 3-laurylmercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3-cyclohexylmercapto propionic acid, lauryl ester of 3-hydroxymethylmercapto propionic acid, myristyl ester of 3-hydroxyethylmercapto propionic acid, octyl ester of 3-methoxymethylmercapto propionic acid, dilauryl ester of 3-hydroxymethylmercapto propionic acid, myristyl ester of 3-hydroxyethylmercapto propionic acid, octyl ester of 3-methoxymethylmercapto propionic acid, dilauryl ester of 3-carboxylmethylmercapto propionic acid, dilauryl ester of 3-carboxypropylmercapto propionic acid, dilauryl-4,7-dithiasebacate, dilauryl-4,7,8,11-tetrathiotetradecandioate, dimyristyl-4,11-dithiatetradecandioate lauryl-3-benzothiazylmercaptopropionate. Preferably the esterifying alcohol is an alkanol having 10 to 18 carbon atoms. Other esters of beta thiocarboxylic acids set forth in Gribbins U.S. Pat. No. 2,519,744 can also be used.

Other beta thiocarboxylic acids include stearyl (1,2-dicarboethoxyethylthio) acetate, stearyl (1,2-dicarbolauryloxyethylthio) acetate or the like. Compounds of this type can be made by (addition of) alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilauryl (succinate) phenylthiodioctyl (succinate), cetyl (1,2-dicarboethoxyethylthio) propionate and benzylthiodimyristyl (succinate).

Similarly useful beta thiocarboxyl synergistic compounds can be prepared by addition of the RSH (mercaptan) compounds as defined above across the double bond of dialkyl itaconates, citraconates, fumarates or trialkyl aconitates, e.g., the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the addition product of the lauryl ester of mercaptopropionic acid with triethyl aconitate.

The thermal stability of the polypropylene and other monoolefin polymer is adversely affected by impurities including residual catalyst. When thermal stability is important in addition to oxidative stability it has been found valuable to include polyvalent metal salts of fatty acids in an amount of 0.01 –10 percent preferably 0.1 –5 percent, in the monoolefin polymer formulations. Examples of such salts are calcium stearate, calcium 2-ethylhexoate, calcium octate, calcium oleate, calcium ricinoleate, calcium myristate, calcium palmitate, calcium laurate, barium laurate, barium stearate, magnesium stearate as well as zinc stearate, cadmium laurate, cadmium octoate, cadmium stearate and the other polyvalent metal salts of fatty acids set forth previously.

There can also be added other phenolic antioxidants in an amount of 0.01 –10 percent, preferably 0.1 –5 percent. Examples of such phenols include 2,6-di-t-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis(4-methyl-6-t-butylphenol), 2,6-butyl-4-decyloxyphenol, 2-t-butyl-4-dodecyloxyphenol, 2-t-butyl-4-dodecyloxyphenol, 2-t-butyl-4-octadecyloxyphenol, 4,4'-methylene-bis(2,6-di-t-butylphenol), p-aminophenol, N-lauryloxy-p-aminophenol, 4,4'-thiobis(3-methyl-6-t-butylphenol), bis[o-(1,1,3,3-tetramethylbutyl)phenol] sulfide, 4-acetyl-$\beta$-resorcylic acid, A stage p-t-butylphenolformaldehyde resin, 4-dodecyloxy-2-hydroxybenzophenone, 3-hydroxy-4-(phenylcarbonyl)phenyl palmitate, n-dodecyl ester of 3-hydroxy-4-(phenylcarbonyl) phenoxyacetic acid, and t-butyl-phenol as well as those shown in Belgian Pat. No. 710,873 and French Pat. No. 1,536,020.

The use of epoxy compounds in an amount of 0.01 –5 percent in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin-bisphenol A resins (epichlorhydrindiphenylolpropane resins), phenoxy-propylene oxide, butoxypropylene oxide, epoxidized neopentylene oleate, glycidyl epoxystearate, epoxidized $\alpha$-olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidyl ether of hydroquinone, glycidyl ether of 1,5-dihydroxynaphthalene, epoxidized linseed oil fatty acids, allyl glycidyl ether, butyl glycidyl ether, cyclohexene oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

The compounds of the present invention can also be employed in conjunction with phosphites and thiophosphites as antioxidants and stabilizers. The phosphite or thiophosphite is employed in an amount of 0.01 to 10 percent of the polymer (or other material) being stabilized. Thus there can be employed tristearyl phosphite, trilauryl trithiophosphites in Friedman U.S. Pat. No. 3,039,993, Friedman U.S. Pat. No. 3,047,608, Friedman U.S. Pat. No. 3,053,878 or Larrison U.S. Pat. No. 3,341,629.

The novel compounds of the present invention are also useful as antioxidants in an amount of 0.01 to 10 percent to stabilize food against rancidity including edible animal and vegetable oils and fats, e.g., lard, soybean oil, hydrogenated cottonseed oil, coconut oil, butter, corn oil, olive oil, cod liver oil, and other fish oils, ice cream, mayonnaise, pastries, cakes, breads, doughnuts, popcorn, cookies, potato chips, oleomargarine, bacon and other meats, peanuts and other nuts.

Furthermore the novel compounds of the present invention are useful as antioxidants in an amount of 0.01 to 10 percent in synthetic lubricants, polyurethanes, polyamides, e.g., nylon 66, polyesters, e.g., polyethylene terephthalate, polymethyl methacrylate, polyoxymethylene polymers (e.g., Delrin and Celcon), polyphenylene oxide, polystyrene, polyacrylonitrile, styrene polymers, highly fluorinated hydrocarbons, silicones, aliphatic esters as well as any of other materials stabilized by the phenolic antioxidants of Belgian Pat. No. 710,873 or French Pat. No. 1,536,020.

PREPARATION OF INTERMEDIATES

A. N,N-dimethyl-3,5-di-t-butyl-4-hydroxybenzyl amine

A mixture of 103 grams of 2,6-di-t-butylphenol, 500 ml. of ethanol, 248 grams of 25 percent aqueous solution of dimethyl amine and 75 grams of a 37 percent aqueous solution of formaldehyde was stirred at 0°–2° C. for 1 hour and then warmed to reflux for 4 hours. The batch was then poured into 2 liters of cold water/ice and the resultant solids filtered off and washed copiously with water to yield 97 1/2 percent of theory of the title compound, M.P. 90°–92° C.

B. Methylene bis(butyl-3-thiopropoxy-carbopropionate)

A mixture of 184.2 grams of diallyl malonate, 324.5 grams of butyl mercaptopropionate, and 0.1 gram of benzophenone was irradiated with ultra violet light at 40°–60 C. until test for unreacted SH (by iodine titration) was negative. Yield: quantitative, as a pale yellow oil $n_D^{25}$ 1.4829.

EXAMPLE 1

2,6-di-t-butyl-4-[ethylene bis(butyl-3-thiopropoxy-carbopropionate)]

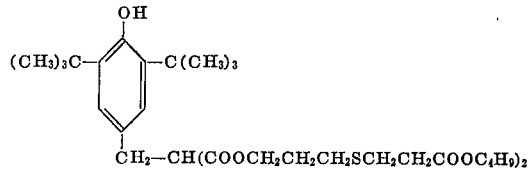

A mixture of 26.33 parts of N,N-dimethyl-3,5-di-t-butyl-4-hydroxybenzylamine, 50.87 parts of methylene bis(butyl-3-thiopropoxycarbopropionate), 75 parts of toluene and 1 part of magnesium methylate was heated to reflux in an inert atmosphere for 14 hours. The batch was then worked up by washing with water and dilute hydrochloric acid and the organic layer solvent stripped to yield the title compound in an amount of 61 parts (84 percent) as a viscous amber oil, $n_D^{25}$ 1.5088.

EXAMPLE 1-(3,5-di-t-butyl-4-hydroxyphenyl)-3,3-bis (dodecoxycarboethylthio) butane

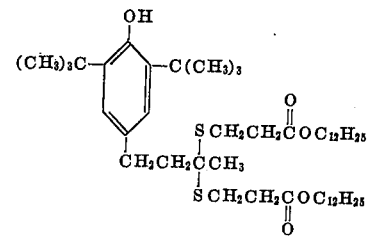

An amber liquid was prepared by refluxing 27.6 parts of 1-(3,5-di-t-butyl-4-hydroxyphenyl)-3-butanone and 54.8 parts of lauryl mercaptopropionate in 150 parts of toluene using 1 part of p-toluenesulfonic acid (P.T.S.A.) as a catalyst until the theoretical amount of water was removed. The product was then worked up as in example 1 to yield 77 parts (95 percent yield) of the title compound as a viscous amber oil, $n_D^{25}$ 1.498.3.

EXAMPLE 3

1-(3,5-di-t-butyl-4-hydroxyphenyl)-3,3-bis (octadecoxycarboethylthio) butane

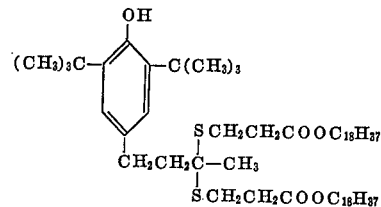

The procedure of Example 2 was repeated using 71.6 parts of stearyl mercaptopropionate in place of the lauryl mercaptopropionate to produce the title compound in a yield of 90.8 parts (93.3 percent) as a yellow liquid, $n_D^{25}$ 1.4902.

EXAMPLE 4

Bis(3,5-di-t-butyl-4-hydroxybenzyl) bis (butoxycarboethylthiopropyl) malonate

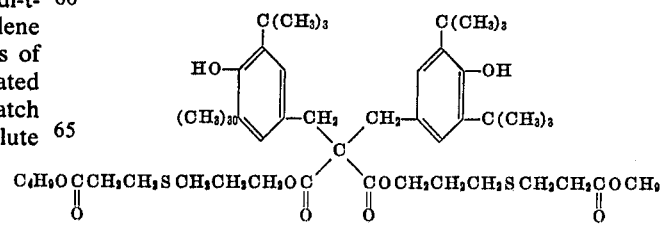

12.4 parts of diallyl bis (3,5-di-t-butyl-4-hydroxybenzyl) malonate and 6.5 parts of butyl mercaptopropionate were reacted in 100 parts of hexane at reflux using 0.0004 mole azoisobutyronitrile (AIBN) as the catalyst and the solvent removed by distillation. The title product was obtained in a yield of 18.7 parts (99 percent) as an amber liquid.

EXAMPLE 5 bis (3,5-di-t-butyl-4-hydroxybenzyl) bis (methoxycarboethylthiopropyl) malonate

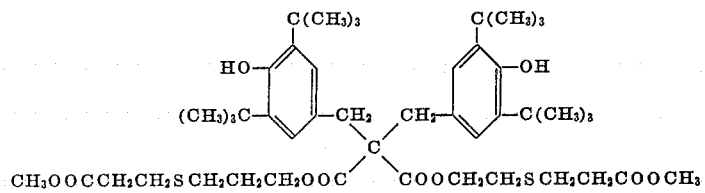

31 parts of diallyl bis(3,5-di-t-butyl-4-hydroxybenzyl) malonate and 12 parts of methyl mercaptopropionate were reacted under the same conditions as Example 4 (100 parts hexane solvent and 1 part AIBN) and there was recovered the title compound in a yield of 42.6 parts (99 percent) as a light yellow oil, $n_D^{25}$ 1.5289.

EXAMPLE 6

2,3-bis(dodecoxycarboethylthio) propyl-3-(3,5-di-t-butyl-4-hydroxyphenyl) propionate

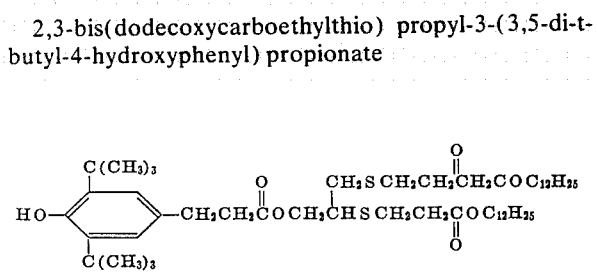

15.9 parts of allyl-3-(3,5-di-t-butyl-4-hydroxyphenyl) propionate and 27.3 parts of dilauryl dithiopropionate were reacted for 24 hours in the presence of 0.2 part of iodine as a catalyst and worked up by washing with water and stripping the solvent to yield the title compound in a yield of 40.3 parts (93 percent) as a light colored oil, $n_D^{25}$ 1.4885.

EXAMPLE 7

2,2-bis[3-(dodecoxycarboethylthio) propoxymethyl] butyl-3'-(3,5-di-t-butyl-4-hydroxyphenyl) propionate

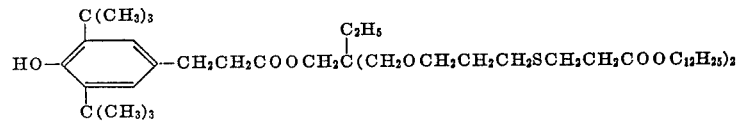

47.4 parts of 2,2-bis(allyloxymethyl) butyl-3'-(3,5-di-t-butyl-4-hydroxyphenyl) propionate and 54.8 parts of lauryl mercaptopropionate were reacted several days under ultraviolet irradiation to yield 98.7 parts (97 percent) of the title compound as a light colored oil, $n_D^{25}$ 1.4912.

Alternatively the reaction can be carried out in 200 parts of hexane at reflux using 1 part AIBN as the catalyst.

EXAMPLE 8

Allyl-3-(3,5-di-t-butyl-4-hydroxybenzylthio)propionate

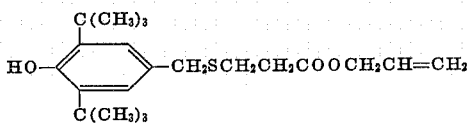

There were reacted 0.22 mole of 3,5-di-t-butyl-4-hydroxybenzylcarboxyethyl sulfide with 0.95 mole of allyl alcohol using 0.006 mole of P.T.S.A. as a catalyst. After removal of the excess allyl alcohol by distillation, the title compound was recovered in a yield of 98 percent as a colorless oil, $n_D^{25}$ 1.5257.

EXAMPLE 9

3,5-di-t-butyl-4-hydroxybenzyl-3-lauryl carboxyethyl sulfide

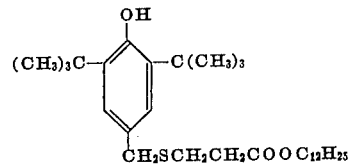

3,5-di-t-butyl-4-hydroxybenzyl mercaptan (0.1 mole) was reacted with 0.1 mole of lauryl acrylate in 100 ml. of benzene at reflux using 0.5 gram of sodium methoxide as a catalyst. The title compound was recovered in a yield of 98 percent as a yellow oil, $n_D^{22}$ 1.5025.

EXAMPLE 10

3-(butoxycarboethylthio) propyl-3'-(3,5-di-t-butyl-4-hydroxybenzylthio) propionate

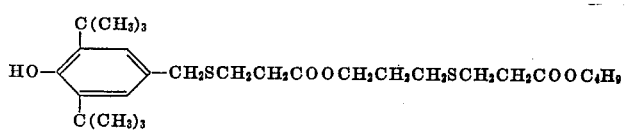

36.5 parts of allyl-3(3,5-di-t-butyl-4-hydroxybenzylthio) propionate and 16.2 parts of butyl mercaptopropionate were reacted for several days in 200 parts of refluxing hexane using 0.5 parts of AIBN as the catalyst. Upon removal of the solvent there was recovered the title compound as a liquid in an amount of 52.3 parts (99 percent), $n_D^{26}$ 1.5188.

EXAMPLE 11 bis[3-(dodecyloxycarboethylthio propyl)]-α-(3,5-di-t-butyl-4-hydroxyphenyl) succinate

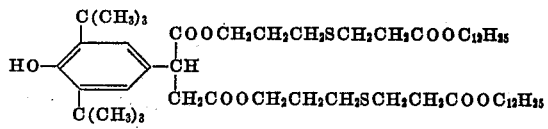

A mixture of 40.56 parts of diallyl -α-(3,5-di-t-butyl-4-hydroxyphenyl) succinate, 54.8 parts of lauryl mercaptopropionate and 0.5 parts of benzophenone (catalyst) was irradiated with ultra voilet light at 40°–60 C. until the reaction was complete as ascertained by titration of the mixture with iodine solution. The title compound was produced in a quantitative yield as a pale yellow oil, $n_D^{25}$ 1.4938.

EXAMPLE 12

3-(dodecyloxycarboethylthio) propyl-3'-(3,5-di-t-butyl-4-hydroxyphenyl) propionate

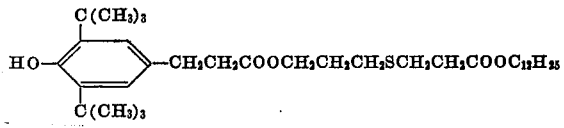

A mixture of 31.85 parts of allyl -β-(3,5-di-t-butyl-4-hydroxyphenyl) propionate and 27.4 parts of lauryl mercaptopropionate containing 0.05 part of benzophenone a catalyst was irradiated with ultra violet light for several days at 40°–60° C. in an inert atmosphere (nitrogen) until a test for SH by iodine titration was negative. The yield of the title compound was quantitative. Molecular weight was determined as 580 (calculated 592). The product was a viscous, almost colorless oil, $n_D^{27}$ 1.4980.

EXAMPLE 13

Bis(carbododecoxyethylthio)-4-hydroxy-3,5-di-t-butylphenyl methane

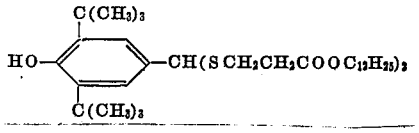

0.064 mole of 3,5-di-t-butyl-4-hydroxybenzaldehyde was reacted with 0.128 mole of lauryl mercaptopropionate using 0.002 mole of P.T.S.A. as catalyst. The yield of the title compound was 83 percent as a white solid, M.P. 34° C.

EXAMPLE 14

3,5-di-t-butyl-4-hydroxybenzal methylene bis (methyl-2-methyl-3-thioethoxycarbopropionate)

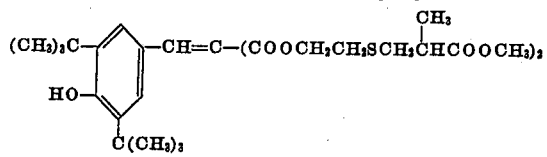

A mixture of 23.4 grams of 3,5-di-t-butyl-4-hydroxybenzaldehyde, 42.4 grams of methylene bis(methyl-2-methyl-3-thioethoxycarbopropionate), 1.1 grams of piperidine benzoate (as catalyst) and 200 ml. of anhydrous toluene was refluxed until the theoretical amount of water had azeotroped off. The residue was washed with water, dilute hydrochloric acid solution, dilute sodium bicarbonate solution and then again with water. After drying over sodium sulfate and filtering, the organic phase was freed of solvents by vacuum stripping to yield the title compound in a yield of 99 percent as a viscous red oil which crystallized slowly on prolonged standing.

EXAMPLE 15

3,5-di-t-butyl-4-hydroxybenzylmethylene bis (methyl-2-methyl-3-thioethoxycarbopropionate)

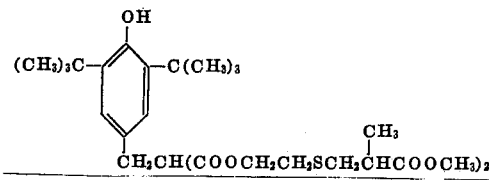

A mixture of 42.4 grams of methylene bis(methyl-2-methyl-3-thioethoxycarbopropionate), 25.48 grams of 3,5-di-t-butyl-4-hydroxybenzyl chloride, 5.4 grams of sodium methoxide, and 200 ml. of benzene was stirred at room temperature overnight, the by-product filtered off and the residue worked up (solvent removed by vacuum stripping) to yield the title compound in an amount of 90 percent of theory as a red viscous oil, $n_D^{25}$ 1.5160.

EXAMPLE 16

3,5-di-t-butyl-4-hydroxybenzylbutylcarboxyethylthiopropylcarboxymethyl ether

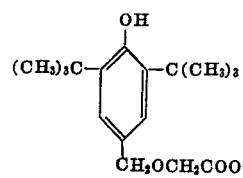

0.1 mole of 4-hydroxy-3,5-di-t-butyl benzyl chloride was reacted with 0.1 mole of allyl glycolate in the presence of 0.1 mole of triethylamine in 100 ml. of benzene. After refluxing for 3 hours, the theoretical amount of triethylamine hydrochloride was filtered off. After stripping the solvent, the residual oil was reacted with 0.1 mole of butyl-3-mercaptopropionate in 100 ml. hexane under reflux with 0.01 gram azobisisobutyronitrile as a catalyst. The title compound was isolated as a pale yellow oil.

EXAMPLE 17

3,5-di-t-butyl-4-hydroxybenzyl lauryl carboxyethylthiopropylcarboxyethyl sulfide

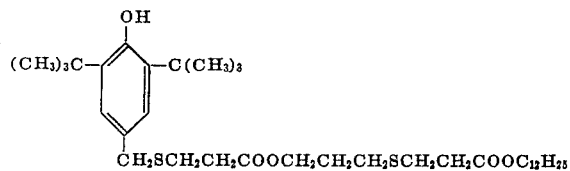

CH₂SCH₂CH₂COOCH₂CH₂CH₂SCH₂CH₂COOC₁₂H₂₅

0.1 mole of 3,5-di-t-butyl-4-hydroxybenzylallylcarboxyethyl sulfide was reacted with 0.1 mole of lauryl mercaptopropionate in hexane under reflux with 0.01 gram of AIBN as a catalyst. The title compound was a light colored oil soluble in hydrocarbons but insoluble in lower alcohols, $n_D^{25}$ 1.5248.

EXAMPLE 18

3,5-di-t-butyl-4-hydroxybenzyl laurylcarboxyethylthioethylcarboxyethyl ether

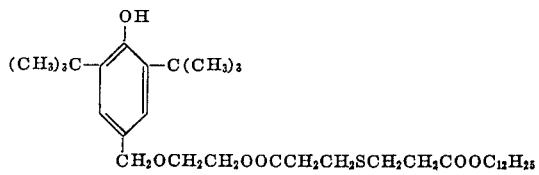

CH₂OCH₂CH₂OOCCH₂CH₂SCH₂CH₂COOC₁₂H₂₅

0.2 mole of hydroxyethyl acrylate was reacted with 0.2 mole of 3,5-di-t-butyl-4-hydroxybenzyl chloride in 200 ml. of benzene in the presence of 0.2 mole of pyridine for 2 hours at reflux. The mixture was then drowned in 0.5 liter of water, separated from the water and the organic solvent removed by stripping. The acrylate ester left as a residue was then reacted with 0.2 mole of lauryl mercaptopropionate in 200 ml. of t-butyl alcohol with 0.5 gram of sodium t-butylate as a catalyst. After reacting at room temperature for 5 hours the mixture was again drowned in 1 liter of water. The title compound was isolated as a yellow oil after stripping at 100° C. and 1 mm.

The products of the invention were tested as stabilizers for polypropylene in accelerated aging tests run at 150° C. in a circulating air oven using the indicated amounts of the compounds per hundred parts of polypropylene (phr)

| Example | phr | Hours to Degrade |
|---------|------|------------------|
| 1 | 0.5 | 1224 |
| 2 | 0.5 | 624 |
| 3 | 0.5 | 1272 |
| 4 | 0.5 | 1816 |
| 5 | 0.5 | 1848 |
| 6 | 0.5 | 736 |
| 7 | 0.25 | 1700 |
| 9 | 0.3 | 144 |
| 10 | 0.5 | 496 |
| 11 | 0.5 | 2088 |
| 12 | 0.5 | 784 |
| 13 | 0.5 | 460 |
| 14 | 0.5 | 1080 |
| 15 | 0.5 | 1120 |

In a recheck of the compound of example 7, the polypropylene was still ok after 1512 hours.

The polypropylene employed in the above tests was Profax 6501.

In the following tests the numbers identify the compounds of the examples in which the compound was made. The letter (a) stands for 2,4-bis(4-hydroxy-3,5-di-t-butyl-phenoxy (n-octylthio)-1,3,5-triazine and the letter (b) stands for octadecyl-3(3,5-di-t-butyl-4-hydroxyphenyl) propionate.

Antioxidants A, B, C and D are commercially available antioxidants outside the invention. BHT is butylated hydroxy toluene.

LATEX ADHESIVES

I. Natural Rubber

The effectiveness of various antioxidants (1.0 percent concentration) in preventing discoloration and loss of flexibility of a natural rubber latex (Formulation 1) was determined by applying a 10-mil wet film on unsized cotton and aging at 100° C. for 115 hours. Results are shown in Table 1, in order of decreasing effectiveness.

TABLE 1

Natural Rubber Latex 115 hours at 100° C.

|  | Color | Flexibility |
|---|---|---|
| Compound of Ex. 1 | light yellow | excellent |
| Antioxidant B | light yellow | excellent |
| Compound a | light yellow | excellent |
| Antioxidant A | light yellow | excellent |
| Antioxidant D | light yellow | excellent |
| Compound b | yellow; spotting | good |
| Antioxidant C | yellow; spotting | good |
| BHT | brown | very poor |
| Control | dark brown | very poor |

II. CARBOXYLATED STYRENE-BUTADIENE LATEX

The effectiveness of various antioxidants (1.0 percent concentration) in preventing discoloration and loss of flexibility of a carboxylated SBR latex (Formulation 2) was determined by preparing a free film (20 mil wet film thickness cured at 45° C. for 30 min.), aging at 130° C. for 110 hours, and evaluating discoloration and loss of flexibility. The results of this evaluation are listed in Table 2, in order of decreasing effectiveness.

The stability to discoloration by gas fading of various antioxidants in the carboxylated SBR latex formulation (10 mil. wet film on unsized cotton cloth) is shown in Table 3. All samples were white prior to exposure.

TABLE 2

Carboxylated SBR Latex

|  | Color | Flexibility |
|---|---|---|
| Compound of Ex. 3 | light yellow | good |
| Compound b | light yellow | good |
| Compound a | light yellow | good |
| Antioxidant D | yellow | good |
| Antioxidant B | yellow | good |
| Antioxidant C | light brown | poor |
| BHT | dark brown | very poor |

| Antioxidant A | dark brown | very poor |
| Control | dark brown | very poor |

TABLE 3

GAS FADE STABILITY

Carboxylated SBR Latex - 1 Cycle AATCC Gas Chamber 1.0% ANTIOXIDANT

| Antioxidant | Color After Exposure |
|---|---|
| Compound a | White |
| Compound of Ex. 3 | White |
| Compound b | Pale yellow |
| Antioxidant A | Bright yellow |
| Antioxidant B | Bright yellow |
| Antioxidant C | Brown |
| Antioxidant D | White |
| BHT | White |

III HOT MELT ADHESIVES ETHYLENE-VINYL ACETATE COPOLYMER

The effectiveness of various antioxidants in maintaining the viscosity of an ethylene/vinyl acetate adhesive formulation (Formulation 3) was determined by heating the adhesive at 350° F. in contact with a stainless steel strip. An initial evaluation rating the antioxidants in order of effectiveness indicated the superiority of the compounds of Examples 1,2,3 and 4 as antioxidants over all competitive products tested.

IV. POLYAMIDES

The effectiveness of various antioxidants in inhibiting skinning of two polyamide hot melt adhesives (Versamid 741 and Versalon 1055, General Mills) was determined by heating at 395° F. in tin cans and measuring the time to skinning. Results are shown in Table 4.

TABLE 4

Stabilization of Polyamide Hot Melt Adhesives

| Antioxidant (1.0%) hrs. at 395° F. | Versamid 741<br>1 2 3 4 5 6 7 8 | Versalon 1055<br>1 2 3 4 5 6 7 8 |
|---|---|---|
| Control | 0 1 1 1 2 2 2 2 | 0 0 0 0 1 2 2 2 |
| Compound a | 0 0 0 0 0 1 1 1 | 0 0 0 0 0 0 0 0 |
| Compound of Ex. 4 | 0 0 0 0 0 0 0 0 | 0 0 0 0 0 0 1 1 |
| Compound of Ex. 2 | 0 0 0 0 0 0 0 0 | 0 0 0 0 0 1 1 1 |
| Compound b | 0 0 1 1 1 2 2 2 | 0 0 1 1 1 1 1 2 |
| Antioxidant A | 0 0 0 0 1 1 2 2 | 0 0 0 0 0 0 1 2 2 |
| Antioxidant B | 0 1 1 2 2 2 2 2 | 0 1 2 2 2 2 2 2 |
| Antioxidant C | 0 0 0 0 0 0 0 1 | 0 1 1 1 1 2 2 2 |
| BHT | 0 1 1 1 1 1 1 2 2 | 0 0 1 1 1 1 1 2 |

0 - no skinning
1 - slight local skinning
2 - skinning over total surface

The formulations used in the above tests were as follows:

FORMULATION 1

Natural Rubber Latex Formulation

| | Parts by weight |
|---|---|
| Centrifuged natural rubber latex (62%) | 161 |
| KOH solution (10%) | 5 |
| Ammonium caseinate solution (10%) | 5 |
| Zinc oxide dispersion (60%) | 5 |
| Rayox dispersion* (70%) | 11 |
| Sulfur dispersion (68%) | 1.5 |
| Setsit 51* (dithiocarbamate latex accelerator) | 1.5 |

*R. T. Vanderbilt Company TiO₂ filler

FORMULATION 2

Carboxylated SBR Latex

| Carboxylated SBR latex (Tylac 3010, International Latex), 49% | |
|---|---|
| styrene/butadiene ratio (46/54) | 100.0 |
| Calcium carbonate | 136.0 |
| Acrysol GS (sodium polycrylate) | 1.3 |
| Tetrasodium pyrophosphate (5% solution) | 5.2 |

FORMULATION 3

Ethylene/Vinyl Acetate Hot Melt Adhesive

Equal parts of the following were melt blended:
1. Ethylene/vinyl acetate copolymer (Elvax 250, DuPont); 27–29 percent vinyl acetate; melt index, 12–18 g/10 min.
2. Refined paraffin wax (Atlantic 1116, Atlantic Refining Co.); melting point, 151.0° F.
3. Glyceryl ester of hydrogenated rosin (Staybelite Ester No. 10).

What is claimed is:

1. A compound having the following formula: $HOR_1—(CH_2)_y CH_2COOR_2$ where $HOR_1$ is

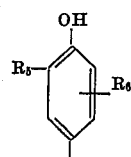

Where $R_5$ is alkyl, cycloalkyl or benzyl, $R_6$ is hydrogen, alkyl, cycloalkyl or benzyl, the total carbon atoms in $R_5$ and $R_6$ is between four and 36 carbon atoms, $R_2$ is
—$CH_2(C_nH_{2n})$ S $(C_nH_{2n})$ COOR$_3$,

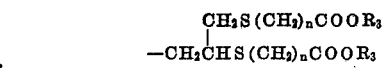

or

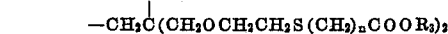

$R_3$ is alkyl or alkenyl of up to 18 carbon atoms, benzyl, phenyl, tolyl or cyclohexyl, $n$ is 1 or 2 is $y$ is 0 or 1.

2. A compound according to claim 1 wherein $R_3$ is alkyl of up to 18 carbon atoms cyclohexyl, phenyl, tolyl or benzyl.

3. A compound according to claim 1 wherein the total carbon atoms in $R_5$ and $R_6$ is not over 12, $R_2$ is $CH_2(C_nH_{2n})S(C_nH_{2n})COOR_s$, $R_3$ is alkyl or alkenyl of up to 18 carbon atoms and $y$ is 1.

4. A compound according to claim 1 wherein the total carbon atoms in $R_5$ and $R_6$ is not over 12, $R_2$ is

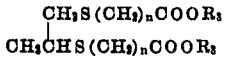

5. A compound according to claim 3 where $n$ is 2 and $R_3$ is alkyl.

6. A compound according to claim 1 wherein $HOR_1$ is 3,5-di-t-butyl-4-hydroxyphenyl.

7. A compound according to claim 1 wherein $R_5$ and $R_6$ are both alkyl and the total of $R_5$ and $R_6$ is not over 12 carbon atoms.

8. A compound according to claim 7 wherein $R_3$ is alkyl of up to 18 carbon atoms.

9. A compound according to claim 1 having the formula $$HOR_1CH_2CH_2COOCH_2\overset{C_nH_{2n-1}}{\underset{|}{C}}(CH_2OCH_2CH_2CH_2S(CH_2)_nCOOR_3)_2$$

where $R_3$ is alkyl or alkenyl of up to 18 carbon atoms.

10. A compound according to claim 9 wherein $R_5$ and $R_6$ are both alkyl and the total of $R_5$ and $R_6$ is not over 12 carbon atoms.

11. A compound according to claim 10 wherein $R_3$ is alkyl of up to 18 carbon atoms.

12. A compound according to claim 11 where $n$ is 2.

13. A compound according to claim 9 where $n$ is 2.

14. A compound according to claim 9 where $HOR_1$ is 3,5-di-t-butyl-4-hydroxyphenyl.

* * * * *